Figure 1:
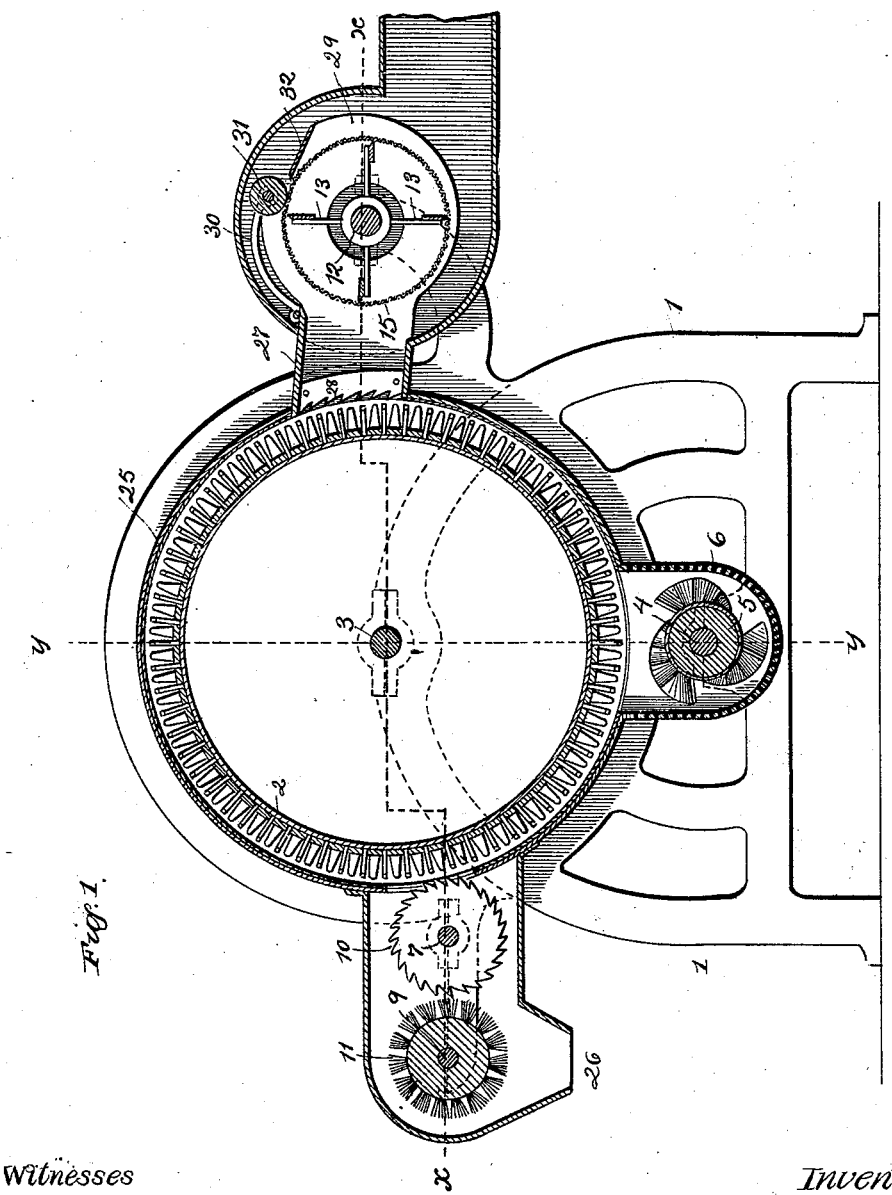

(No Model.) 4 Sheets—Sheet 1.
J. J. FAULKNER.
COTTON SEED DELINTER.

No. 538,870. Patented May 7, 1895.

Witnesses
Victor J. Evans.
Marie Wilson

Inventor
J. J. Faulkner.
By E. M. Marble & Sons
Attorneys (No Model.) 4 Sheets—Sheet 2.

J. J. FAULKNER.
COTTON SEED DELINTER.

No. 538,870. Patented May 7, 1895.

Witnesses.
Victor J. Evans.
Mane Wilson

Inventor.
J. J. Faulkner.
By E. M. Marble & Sons
Attorneys.

(No Model.) 4 Sheets—Sheet 3.

J. J. FAULKNER.
COTTON SEED DELINTER.

No. 538,870. Patented May 7, 1895.

Witnesses.
Victor J. Evans.
Marie Wilson

Inventor.
J. J. Faulkner.
By E. M. Marble & Son
Attorneys.

(No Model.) 4 Sheets—Sheet 4.
J. J. FAULKNER.
COTTON SEED DELINTER.
No. 538,870. Patented May 7, 1895.
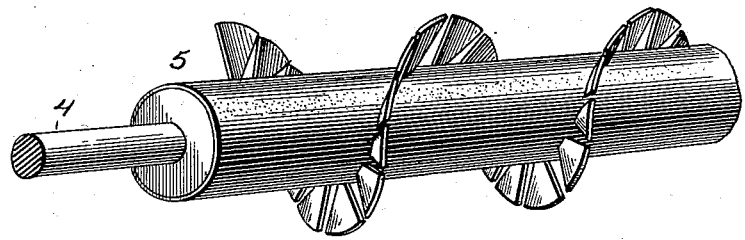
Fig. 4
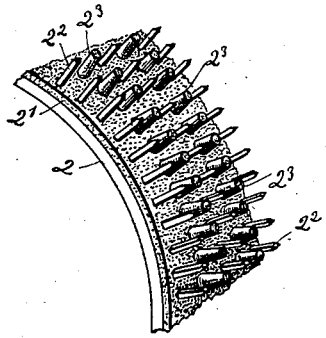
Fig. 6
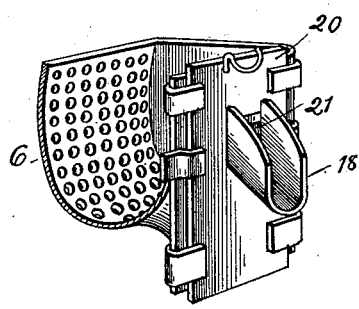
Fig. 5.
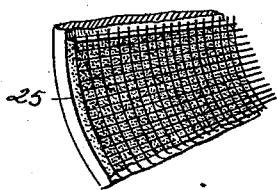
Fig. 7
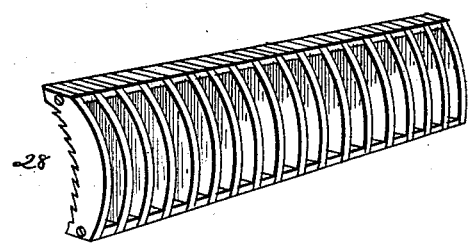
Fig. 8
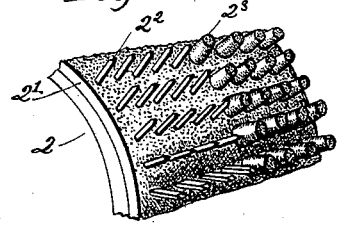
Fig. 6.ª
Witnesses.
Victor J. Evans
Marie Wilson
Inventor
J. J. Faulkner
By E. K. Marble & Sons
Attorneys.

UNITED STATES PATENT OFFICE.

JAMES J. FAULKNER, OF MEMPHIS, TENNESSEE, ASSIGNOR, BY DIRECT AND MESNE ASSIGNMENTS, TO FRANK W. GILCHRIST, OF ALPENA, MICHIGAN, AND THE CONTINENTAL COTTON SEED COMPANY, OF MEMPHIS, TENNESSEE.

COTTON-SEED DELINTER.

SPECIFICATION forming part of Letters Patent No. 538,870, dated May 7, 1895.

Application filed January 2, 1895. Serial No. 533,583. (No model.)

*To all whom it may concern:*

Be it known that I, JAMES J. FAULKNER, a citizen of the United States, residing at Memphis, in the county of Shelby and State of Tennessee, have invented certain new and useful Improvements in Cotton-Seed Delinters; and I do hereby declare the following to be a full, clear, and exact description of the invention, such as will enable others skilled in the art to which it appertains to make and use the same.

My invention relates to improvements in machines for treating cotton seed, and particularly to improvements in that class thereof known as delinters, which act upon the cotton seed after it has been ginned, and it consists of an improved cotton seed delinter, the construction and arrangement of the parts of which, and the various functions thereof, will be hereinafter fully described and particularly pointed out in the claims.

Delinters act upon cotton seed after it has been ginned, operating to remove from the seed all of the cotton fiber left thereon after the ginning operation. Thus it produces on the one hand a bat of cotton, most of the fibers of which are, however, short, and on the other hand cleansed cotton seed, which may be compressed in order to enable the cotton seed oil to be separated therefrom, or otherwise treated according to processes well known in the art.

Delinters have been used, and have been in successful operation for many years, and the art is one in which improvements must be directed toward improving the mechanisms employed to perform the various functions of the machine, and toward the introduction of new principles of operation for the various parts of the machine.

My invention is directed toward the simplification of the construction of machines for delinting cotton seed, and therein toward the arrangement of the conveyer or feeder, and the condenser, in such relation to the main delinting cylinder that not only will the machine be rendered thereby more compact than the present machines, and thus occupy very much less space than is now occupied by a delinter, but the delinting operation will be facilitated and the product will be obtained in a more finished condition.

The principal features of the improved machine which forms the subject of this application are, first, the arrangement of the feeding or conveying screw cylinder or agitator immediately below and in close proximity to the main delinting cylinder, the causing of said feeder or conveyer to operate in a casing composed of perforated sheet iron, or wire gauze, whose meshes are smaller than the diameter of the cotton seed, and the feeding of the cotton seed to be delinted to the said feeding or conveying screw both from a chute entering one end of the same and from a feed opening at the top of the delinting cylinder; second, the formation on the feeding or conveying screw cylinder, and on the casing or shrouding surrounding the main delinting cylinder, of emeried surfaces, which serve to render the delinting operation more rapid and more complete; third, the use for the clothing or fillets of the main delinting cylinder of strips of emery-coated rubber or leather having spikes projecting from their surfaces alternating with emery blocks; fourth, the means used to prevent the formation of ropes or cords of cotton fiber on the delinting cylinder, and to cause the cotton fiber to pass to the condenser as soon as it is separated from the cotton seed; fifth, the arrangement of the condenser in immediate proximity to the main delinting cylinder, it being separated therefrom by but a short feeding section, and certain details in the construction of the condenser, which enable the cotton fiber to be readily carried off the surface of the same; sixth, certain other details in construction and operation which will be hereinafter described and pointed out.

By the arrangement of the feeder or conveyer directly under the main delinting cylinder, and by causing the same to operate in a casing which is provided with a number of apertures, I not only free the cotton seed by the normal operation of the feeder from a great portion of the dirt which is carried along with it to the delinter, but facilitate the cleansing and delinting of the seed, as the cleaned seed is heavier than the uncleaned seed, and thus gravitates to the bottom of the feeding casing, while the uncleaned seed continually rises to the top, where it is more readily acted upon and subjected to such scouring as is necessary to completely clean it, and remove from it all cotton fiber which may adhere to its surface.

My invention is fully illustrated in the drawings which accompany and form a part of this application, in which the same reference numerals refer to the same or corresponding parts, and in which—

Figure 2:
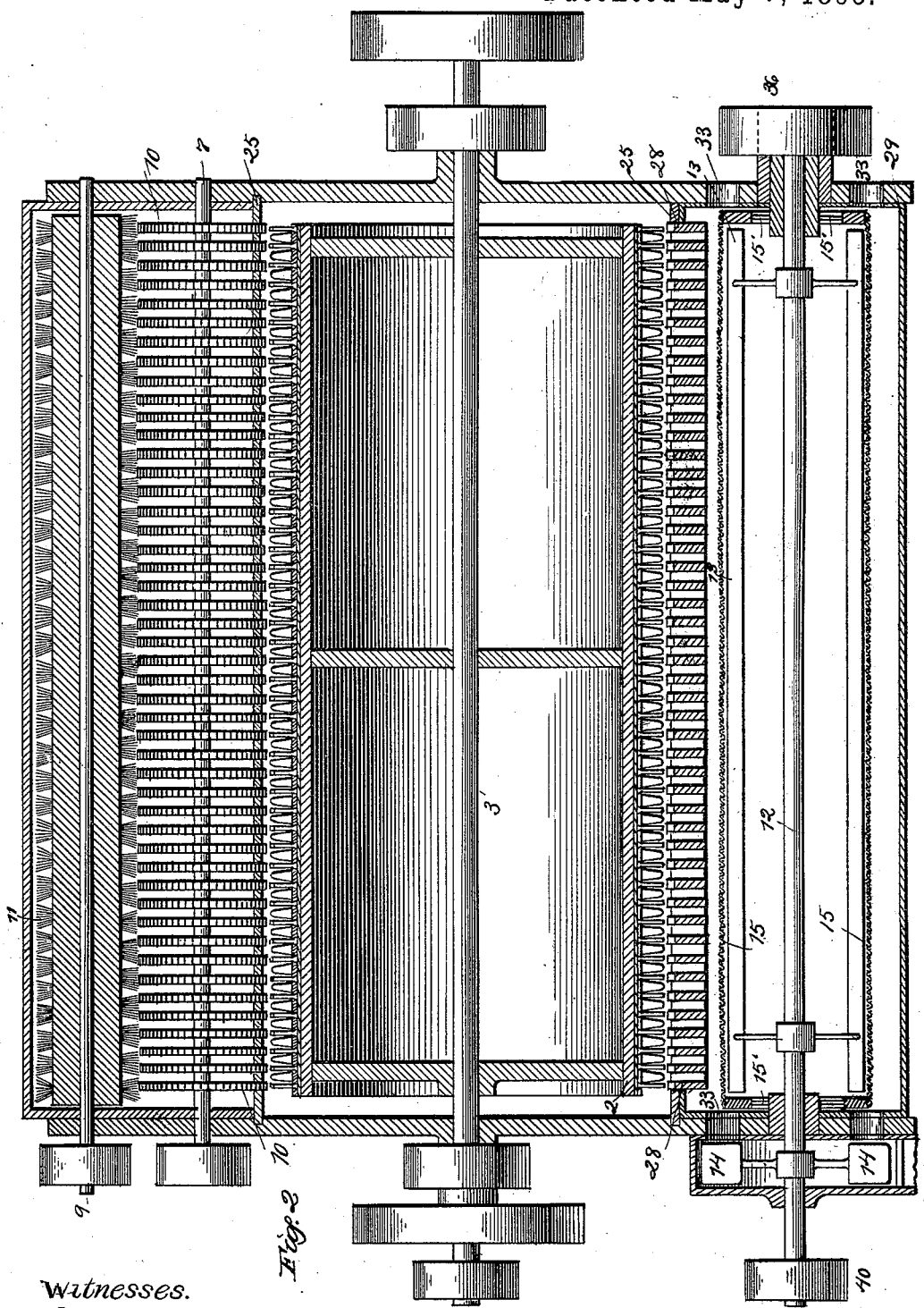
Figure 3:
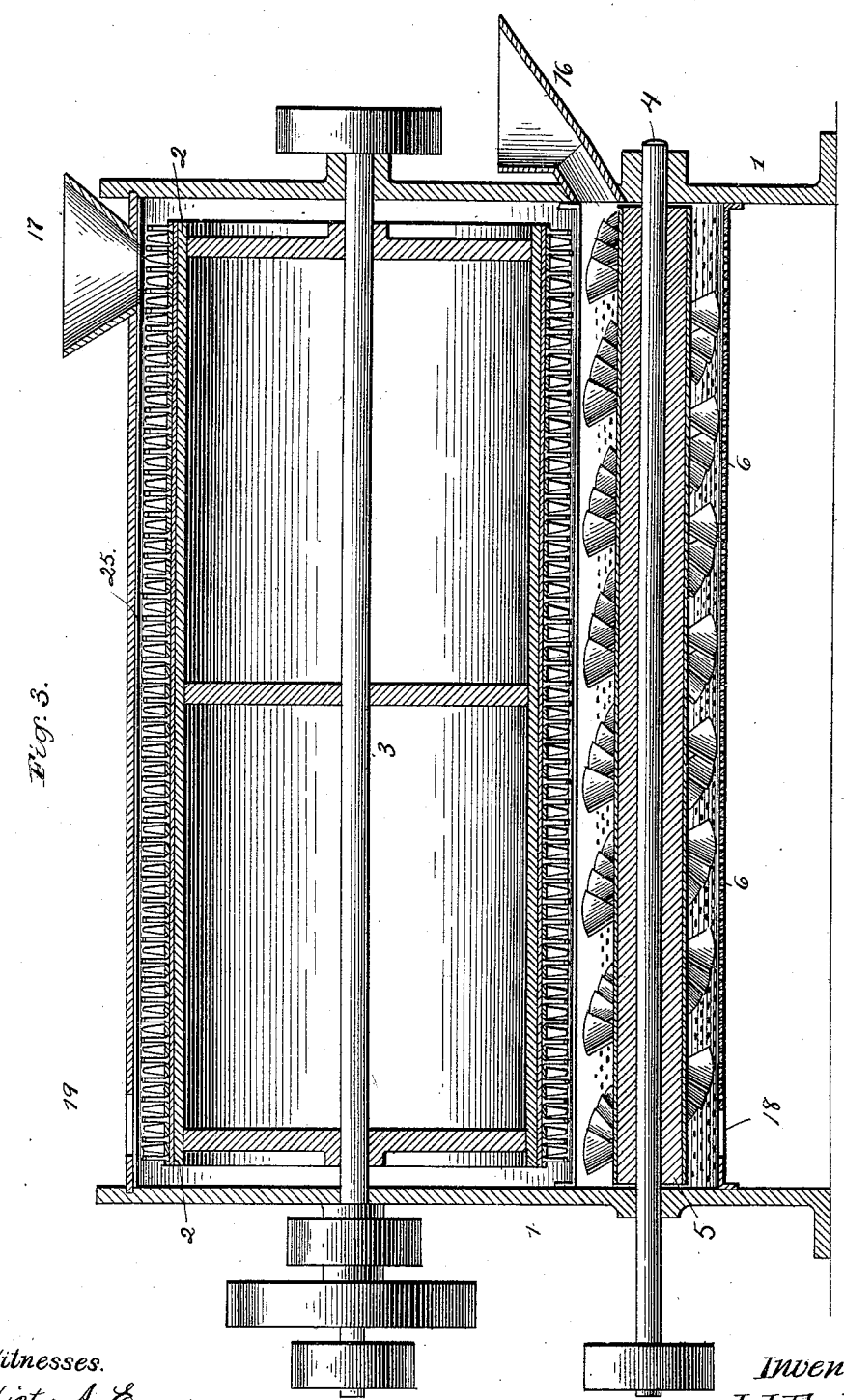

Figure 1 is a transverse section of my entire machine, showing the location of the various parts and indicating the construction of the same. Fig. 2 is a plan section of the machine, taken on the line X X, Fig. 1, showing particularly the construction and arrangement of the saws which work through one portion of the casing or shrouding of the main delinting-cylinder and are designed to take out bunches of cotton which may pass up from the feeder and which mat unless they are taken out, and also showing the construction of the condenser. Fig. 3 is a horizontal section of the machine, taken on the line Y Y, Fig. 1, showing the flights on the feeder, and also showing the feed-spouts and the seed-outlet openings. Fig. 4 is a detail view of the face of the feeding or conveying screw-cylinder. Fig. 5 is a detail view of the seed-outlet spout. Fig. 6 is a detail view of the surface of the main or delinting cylinder. Fig. 6ª is a view of a portion of a modified form of cylinder-surface. Fig. 7 is a detail view of the casing or shrouding for the main or delinting cylinder, showing the emeried surface of the same. Fig. 8 is a detail view of the toothed frame which prevents the formation of ropes of cotton fiber on the main or delinting-cylinder and aids the conducting of the cotton fiber to the condenser.

Referring to the drawings, 1 represents the main machine frame. It is formed with legs, and supports above the surface of the ground the main delinting cylinder 2, and all parts connected therewith. In this frame is journaled the shaft 3 of the main delinting cylinder, and the shaft 4 of the feeding or conveying cylinder 5, which is situated directly underneath and in line with the main delinting cylinder and rotates in the casing 6. This casing is perforated, and is made either of sheet iron or of wire mesh, though the perforations must be smaller than the diameter of the cotton seed so that the cotton seed will not escape therethrough. There is no shrouding between the main delinting cylinder and this feeder or conveyer, an opening the width of the feeder casing being formed in the main cylinder casing through which the cotton seed is drawn up to be subjected to the action of the same. In frame 1 are further journaled shafts 7 and 9, which support respectively the saws 10 and the brushes 11, and the shaft 12 of the condenser cylinder, upon which shaft are mounted fans 13 and 14. (See Fig. 2.) Upon short shafts loosely mounted upon the shaft 12 is mounted the condenser cylinder 15. The ends of the condenser cylinder are shown at 15'.

I will now proceed to describe in detail the construction of the various parts of my delinter.

The cotton seed is fed to the delinter either through feeding spout 16, which enters one end of the feeding or conveyer screw cylinder, or through the opening 17 at the top of the main delinting cylinder, or through both of these openings. When the cotton fiber is wet, I prefer to feed it through the opening at the top of the main delinting cylinder, as it is loosened and shaken apart before it reaches the conveyer or feeder, and thus is more easily fed and scoured. Whichever feed opening is used, the cotton seed falls into the feeder or conveyer casing, and is fed forward to the other end of the machine by means of the spirally arranged flights formed on the feeding cylinder, which flights are composed of numbers of short fan like portions. The cylinder surface between the spirals is coated with glue and emery, in order to produce additional friction and to facilitate the delinting operation. The dirt and impurities which are carried with the cotton seed as it is fed to the delinter, in a great measure fall through the openings formed in the casing of the feeder or agitator, and thus escape. The cotton seed as it is carried along the feeder is continually taken up and retaken up by the delinting cylinder and thoroughly scoured. The uncleaned cotton seed, being lighter than the cleaned seed, naturally of itself rises to the top of the feeder, where it is directly exposed to the influence of the delinting cylinder, while the cleaned seed falls to the bottom of the feeder casing, and is swept along to the discharge spout. In this manner I make use of the influence of gravity to assist in the delinting of the cotton seed, and to cause the uncleaned seed to be continually exposed to the delinting action until it is thoroughly cleansed.

The cleansed seed is discharged either through the discharge spout 18 located at one end of the feeder, or through the opening 19 formed in the tail end of the machine at the top of the main delinting cylinder, the former discharge opening being the most commonly used. As shown in detail in Fig. 5, slide valve 20, which moves in discharge spout 18 and regulates the outflow through the same, is formed with the opening 21. This valve may be pushed up into the feeding casing, thereby causing the seed to back up in the feeder casing, or may be pushed down so as to deliver the cleansed seed more freely, the position of the valve being determined by the condition of the seed discharged. In this way I am able to keep the cotton seed in the machine until it is thoroughly cleansed and scoured.

The cotton seed as it is fed into the machine is caught up by the main delinting cylinder, and subjected to an abrading and scouring action between the surfaces of the said cylinder and the casing which is provided therefor. The main cylinder is made of wood. Its surface is covered with a strip of emeried clothing 2' from which project, in alternate series, rows of spikes 2², and of emery blocks 2³. These blocks may have any convenient form, and I do not restrict myself to that shown. The spikes which form the card teeth may be square, chisel pointed, or rounded, but are preferably formed of case hardened steel with square edges on the teeth. The emery blocks are made with a hole in their bottom, which is filled with plaster or cement and then pressed over projecting screw heads formed on the cylinder. In this manner the blocks are held perfectly tight and secure to the cylinder, and are free from expansion by the heat incident to their action, and thus are not likely to be loosened from their position.

If desired the spikes may be used entirely on the first half of the delinting cylinder, and the emeried blocks be reserved for the last half, or that which treats the cotton seed after it has been partially cleaned, this being a matter of detail in construction which is determined by the working conditions of the machine. This form of cylinder surface is illustrated in Fig. 6ª, the view being taken at the middle of the cylinder and showing a portion of both the spikes and the emery blocks.

The casing or shrouding 25 which is provided for the main cylinder, and is shown in detail in Fig. 7, is composed of wire cloth, whose meshes are filled with emery or corundum stone. It is lined on the back side with paper, and the paper is covered with glue, so that the emery or corundum will be held in the meshes of the wire cloth. By this construction of the cylinder and casing, I obtain a very great amount of friction, and am enabled to scour the seed in such a manner as to thoroughly cleanse the same, and remove from the seed all fibers of cotton.

To take out the bunches of cotton which may be fed up into the delinting cylinder, and which would mat unless taken out, I provide the saws 10, which work through a portion of the shrouding of the delinting cylinder, and are spaced so that neither seed nor broken hulls can pass through the shrouding. The fiber which is taken away from the cylinder by these saws is brushed away by the brushes 11, and discharged through the discharge opening 26.

The cotton fiber which is separated by the action of the delinter is mostly composed of short fibers, and the short fibers are drawn, simply by the air current created by the fans 13 and 14 of the condenser, through the casing 27 intermediate the delinting cylinder and the condensing cylinder. The long fibers, however, which have not been taken away from the cotton seed by the ginning operation and are separated by the delinter, tend to form ropes or chains of fiber around the delinting cylinder. To prevent this action, I provide a number of toothed sections 28 at the outer end of the casing 27, the teeth of which act to break up and prevent the formation of any such ropes or chains of fiber, and to cause the long fiber, as well as the short fiber, to be readily and quickly conducted to the condenser cylinder.

The condenser cylinder 15 is mounted upon bearings which loosely rotate upon the fan shaft 12, and is caused to rotate by means of the power pulley 36. A casing 29 is provided for the cylinder to prevent outside currents of air from interfering with the operation of the same. At its top the casing is formed with the hinged portion 30, at the end of which is journaled the pressure roller 31, which running against the surface of the condenser cylinder serves to form the bat. The casing ends with the slanting plate 32, over which the bat of cotton passes as it is delivered from the condenser. The fan 14 is mounted upon the shaft 12 at one end of the condenser and is operated by power pulley 40, and delivers currents of air through openings 33 formed in the end of the casing of the condenser cylinder in such a manner as to separate the bat of cotton fiber which is formed upon the condenser cylinder from the same, the action of the fans 13 inside the condenser cylinder serving to decrease the tendency of the fiber to cling to the condenser cylinder, and thus to assist in the removal of the bat of cotton therefrom.

Having now considered my machine in its various parts, I will explain the operation of the same as a whole.

The cotton seed to be cleansed is fed into the machine through either the feed spout 16, or the opening 17 formed at the top of the delinting cylinder casing, and in either case falls into the feeder casing 6, and is there constantly agitated and carried along by the feeder or conveyer 4 to the tail end of the machine, the cotton seed being continually caught up by the main delinting cylinder and cleansed. The cleaned seed escapes through the discharge spout 18, its outflow being regulated by the valve 20 operating therein, or through the discharge opening 19. The cotton fiber passes around the main delinting cylinder, being continually subjected to the scouring and abrading action of the spiked or toothed surface of the cylinder acting against the emeried face of the casing. At an early point of its separation from the seed the cotton fiber is subjected to the action of the saws 10, which remove any bunches of cotton which may have been carried along to the delinting cylinder, cleaning the cotton from all motes and dirt, and bringing out its best qualities. The cotton fiber is then carried along and is drawn into the condenser, the toothed sections 28 preventing the formation of ropes of cotton fiber, and in the condenser it is rolled into the form of a bat and delivered from the machine over the plate 32.

Having thus fully described my invention, what I claim as new, and desire to secure by Letters Patent, is—

1. In a cotton seed delinter, the combination with a delinting cylinder, and a casing therefor having an aperture therein, of a seed feeder or conveyer in free communication with the delinting cylinder through said aperture, but secured on a level below that of said aperture, whereby seed carried along by said feeder or conveyer will not of itself come into contact with the delinting cylinder, but will be caught up by the suction caused by the action of the delinting cylinder, and subjected to the delinting operation, substantially as described.

2. In a cotton seed delinter, the combination with a delinting cylinder, and a casing therefor having an aperture therein, of a seed feeder or conveyer in free communication with the delinting cylinder through said aperture, and a casing for said feeder or conveyer the bottom of which is on a level below that of the aperture in the delinting cylinder casing, substantially as described.

3. In a cotton seed delinter, the combination with a delinting cylinder, and a casing therefor having an aperture therein, of a seed feeder or conveyer in line with the delinting cylinder and in free communication with the same through said aperture, but secured on a level below that of the aperture in the delinting cylinder casing, substantially as described.

4. In a cotton seed delinter, the combination with a delinting cylinder, of a seed feeder or conveyer underneath and in line with the delinting cylinder, and in free communication with the same, whereby seed carried along by said feeder or conveyer will be caught up by the suction caused by the action of the delinting cylinder, and subjected to the delinting operation, substantially as described.

5. In a cotton seed delinter, the combination with a delinting cylinder, and a casing therefor having an aperture therein, of a seed feeder or conveyer in free communication with the delinting cylinder through said aperture, but secured on a level below that of the aperture in the delinting cylinder casing, and a perforated casing or shrouding in which said feeder or conveyer operates, substantially as described.

6. In a cotton seed delinter, the combination with a delinting cylinder, of a seed feeder or conveyer underneath and in line with the delinting cylinder, and in free communication with the same, and a perforated casing or shrouding in which said feeder or conveyer operates, substantially as described.

7. In a cotton seed delinter, the combination with a delinting cylinder, and a casing therefor having an aperture therein, of a seed feeder or conveyer in free communication with the delinting cylinder through said aperture, but secured on a level below that of said aperture, a perforated casing or shrouding in which said feeder or conveyer operates, a feed supply opening in said casing, and means in said casing for regulating the discharge of the cleansed seed, substantially as described.

8. In a cotton seed delinter, the combination with a delinting cylinder, and a casing or shrouding therefor having seed inlet and outlet openings, and an aperture to permit communication with the seed feeder or conveyer, of a seed feeder or conveyer in free communication with the delinting cylinder through said aperture, but secured on a level below that of said aperture, substantially as described.

9. In a cotton seed delinter, the combination with a delinting cylinder, and a casing or shrouding therefor having seed inlet and outlet openings, and an aperture to permit communication with the seed feeder or conveyer, of a seed feeder or conveyer in free communication with the delinting cylinder through said aperture, but secured on a level below that of said aperture, a perforated casing or shrouding in which said feeder or conveyer operates, a feed supply opening in said casing, and means in said casing for regulating the discharge of the cleansed seed, substantially as described.

10. In a cotton seed delinter, the combination with a delinting cylinder, and a casing or shrouding therefor having at its top a seed inlet opening, of a seed feeder or conveyer underneath and in line with the delinting cylinder, and in free communication with the same, a casing in which said feeder or conveyer rotates, and adjustable means for regulating the discharge of the cleansed seed, substantially as described.

11. In a cotton seed delinter, a delinting cylinder covered with emeried-faced clothing, from part of the surface of which project spikes or card teeth, and from part emery blocks, substantially as described.

12. In a cotton seed delinter, a delinting cylinder covered with emeried-faced clothing, from which project circular rows of spikes and emery blocks in alternate series, substantially as described.

13. In a cotton seed delinter, the combination with a delinting cylinder and a shrouding therefor, of a condenser, a chute leading from said delinter to said condenser, and toothed sections stationed at the entrance of said chute to prevent the formation of ropes of cotton fiber on the delinting cylinder, substantially as described.

14. In a cotton seed delinter, the combination with a delinting cylinder, and a shrouding therefor, of a condenser, and a chute having a series of toothed bars extending across its mouth which come in close contact with the surface of the delinting cylinder, leading from said delinting cylinder to said condenser, substantially as described.

15. In a condenser for treating cotton, the combination with a condenser cylinder, a casing therefor, and fiber inlet and outlet openings, of a fan stationed at one end of the condenser cylinder, and arranged so as to deliver a current of air endwise against the end periphery of the said cylinder, substantially as described.

16. In a condenser for treating cotton, the combination with a condenser cylinder, a casing therefor, and fiber inlet and outlet openings, of a fan journaled inside the condenser cylinder and adapted to prevent the cotton from clinging to said cylinder, substantially as described.

17. In a condenser for treating cotton, the combination with a condenser cylinder, a casing therefor, and fiber inlet and outlet openings, of a fan arranged to deliver a current of air against one end of the condenser cylinder, and a fan journaled inside the condenser cylinder and adapted to prevent the cotton from clinging to the said cylinder, substantially as described.

18. In a condenser for treating cotton, the combination with the condenser cylinder 15, and a casing 29 therefor having openings 33 formed in the same, of the shaft 12, the fans 15 mounted on said shaft and stationed inside the condenser cylinder, and the fans 14 stationed at the end of said cylinder, and adapted to deliver currents of air through the apertures 33 against the periphery of the condenser cylinder, substantially as described.

In testimony whereof I affix my signature in presence of two witnesses.

JAMES J. FAULKNER.

Witnesses:
W. A. BARRET,
B. W. CAPPS.